(12) United States Patent
Underwood et al.

(10) Patent No.: US 9,148,624 B2
(45) Date of Patent: Sep. 29, 2015

(54) SYSTEM FOR AND METHOD OF PROVIDING GRAPHICAL CONTENTS DURING A COMMUNICATION SESSION

(75) Inventors: Rosa M. Underwood, Washington, DC (US); Jimmie D. Peterman, Glenndale, MD (US); Henry A. McKelvey, Capitol Heights, MD (US); Emory L. Young, Reisterstown, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 830 days.

(21) Appl. No.: 12/561,298

(22) Filed: Sep. 17, 2009

(65) Prior Publication Data

US 2011/0066956 A1   Mar. 17, 2011

(51) Int. Cl.
| | |
|---|---|
| G06F 15/16 | (2006.01) |
| H04N 7/14 | (2006.01) |
| H04M 3/02 | (2006.01) |
| H04M 3/06 | (2006.01) |
| H04L 29/06 | (2006.01) |
| H04M 7/00 | (2006.01) |

(52) U.S. Cl.
CPC .......... *H04N 7/147* (2013.01); *H04L 65/1069* (2013.01); *H04L 65/1096* (2013.01); *H04M 3/02* (2013.01); *H04M 3/06* (2013.01); *H04M 7/006* (2013.01); *H04M 2201/42* (2013.01)

(58) Field of Classification Search
CPC .............. H04L 65/403; H04L 65/1006; H04L 65/1096
USPC .......................................... 715/753, 733, 748
See application file for complete search history.

(56) References Cited

U.S. PATENT DOCUMENTS

| | | | | |
|---|---|---|---|---|
| 6,400,804 | B1* | 6/2002 | Bilder | 379/76 |
| 6,768,722 | B1* | 7/2004 | Katseff et al. | 370/260 |
| 8,325,708 | B2* | 12/2012 | Lim et al. | 370/352 |
| 8,335,301 | B2* | 12/2012 | Laws et al. | 379/93.17 |
| 8,477,912 | B2* | 7/2013 | Cai et al. | 379/67.1 |
| 2002/0069218 | A1* | 6/2002 | Sull et al. | 707/501.1 |
| 2003/0086699 | A1* | 5/2003 | Benyamin et al. | 386/96 |
| 2003/0112927 | A1* | 6/2003 | Brown et al. | 379/67.1 |
| 2005/0129187 | A1* | 6/2005 | Agapi et al. | 379/76 |
| 2005/0152531 | A1* | 7/2005 | Hamilton et al. | 379/266.01 |
| 2005/0289264 | A1* | 12/2005 | Illowsky et al. | 710/104 |
| 2006/0003761 | A1* | 1/2006 | Fry et al. | 455/426.1 |
| 2006/0050685 | A1* | 3/2006 | Sung et al. | 370/352 |
| 2006/0090166 | A1* | 4/2006 | Dhara et al. | 719/318 |
| 2006/0109969 | A1* | 5/2006 | Oh | 379/207.16 |
| 2007/0086581 | A1* | 4/2007 | Zhu et al. | 379/88.17 |
| 2007/0116221 | A1* | 5/2007 | Kim | 379/156 |
| 2007/0225030 | A1* | 9/2007 | Teague | 455/550.1 |
| 2007/0233368 | A1* | 10/2007 | Friedmann | 701/208 |
| 2007/0298771 | A1* | 12/2007 | Mottes | 455/414.1 |
| 2008/0101554 | A1* | 5/2008 | Rhee et al. | 379/67.1 |
| 2008/0215680 | A1* | 9/2008 | Salesky et al. | 709/204 |

(Continued)

*Primary Examiner* — Daeho Song (57) ABSTRACT

A system for and method for providing graphical contents during a communication session is presented. The system and method include receiving, via an input/output module, one or more call invite request messages to establish a communication session in a communication network, processing, via a processing module, the one or more call invite request messages to identify a graphical content account associated with one or more users of the communication session, and transmitting, via a presentation module, one or more graphical contents from the graphical content account associated with at least one of the one or more users before an establishment of the communication session.

20 Claims, 6 Drawing Sheets

(56) References Cited

U.S. PATENT DOCUMENTS

| | | | |
|---|---|---|---|
| 2008/0250149 A1* | 10/2008 | Morris | 709/229 |
| 2008/0285554 A1* | 11/2008 | Noguchi | 370/389 |
| 2009/0046838 A1* | 2/2009 | Andreasson | 379/101.01 |
| 2009/0113304 A1* | 4/2009 | Mercier et al. | 715/719 |
| 2009/0168978 A1* | 7/2009 | Laws et al. | 379/93.17 |
| 2010/0080149 A1* | 4/2010 | Lee et al. | 370/259 |
| 2010/0118771 A1* | 5/2010 | Lee et al. | 370/328 |

* cited by examiner

SYSTEM FOR AND METHOD OF PROVIDING GRAPHICAL CONTENTS DURING A COMMUNICATION SESSION

BACKGROUND INFORMATION

Traditional ring tones and/or on-hold recording messages may be boring and irritating to callers. For example, a callee may play a musical ring tone of their favorite song to callers instead of the dull and repetitive ring before the callee may answer the call from the caller. Sometimes, a businesses owner may play recording of a soft-sell sales pitch regarding their products and services in an effort to entice callers to purchase their products and services. Other times, callers may become more aggravated than appeased when the businesses owner selects to play tiresome music from a local radio station for the on-hold recording messages. Therefore, traditional ring tones and/or on-hold recording messages may be deficient to appease and capture the attention of callers.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An exemplary embodiment provides a system and process for providing graphical contents during a communication session (e.g., video calls, video teleconferencing calls, or telephone calls). In an exemplary embodiment, the system and process may allow user to provide one or more graphical contents to another user during a communication session. For example, a user may provide graphical contents in the form of broadcasting or advertising commercials during a communication session. Also, the user may provide the graphical contents in the form of pictures, videos, slides shows, drawings/paintings, graphs/charts and/or other forms of graphical illustrations during a communication session. The system and process may allow a first user to provide one or more graphical contents to a second user when the second user may be put on-hold during a communication session. The system and process may allow a first user to provide one or more graphical contents to a second user during an initiation, of or before establishing, a communication session. Further, the system and process may allow a user to provide different graphical contents to different users. The system and process may allow a user to upload one or more graphical contents to an application system or a graphical content system in order to provide the one or more graphical contents to other users. The system and process may allow a user to provide desired graphical contents to other users from a local storage device associated with the user.

Figure 1:
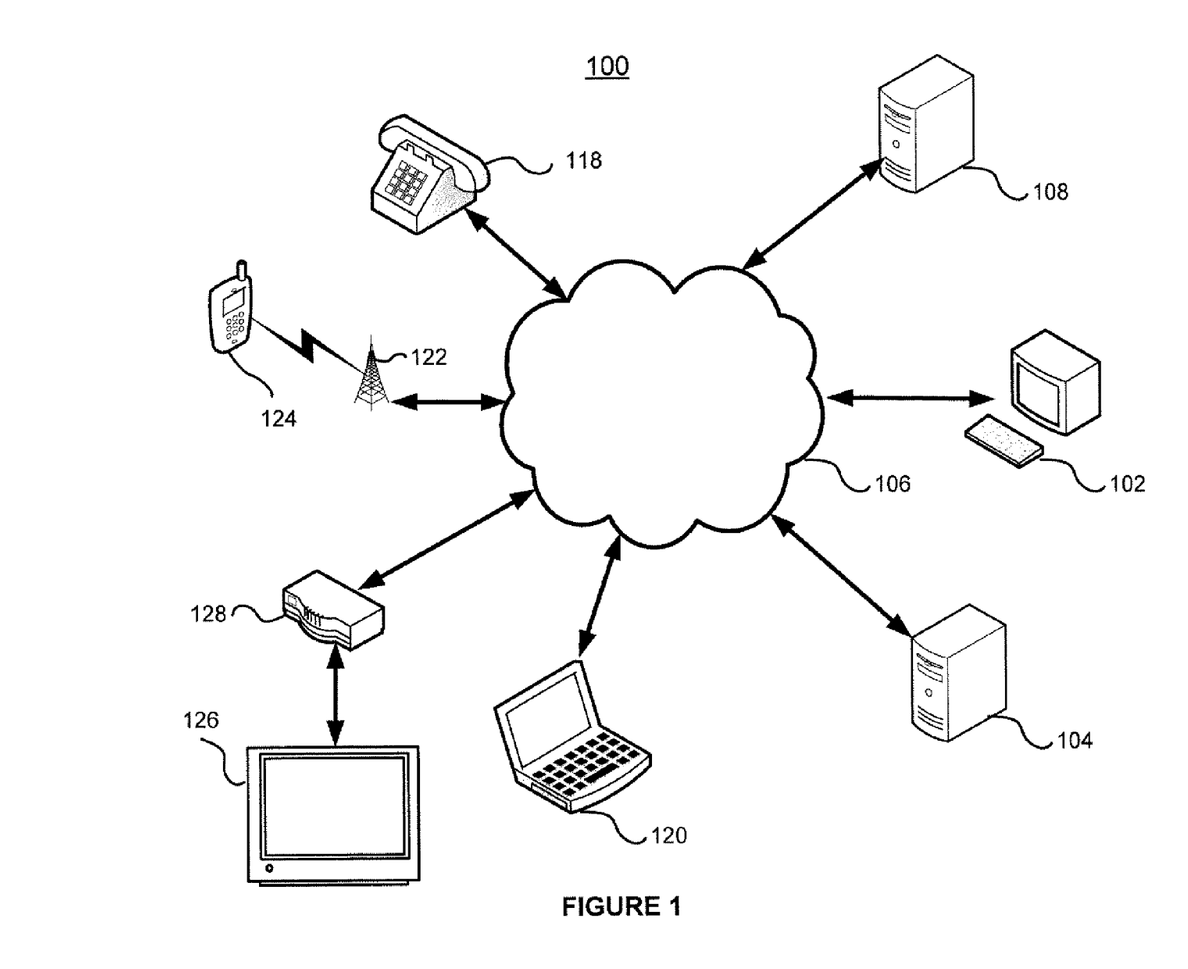
FIG. 1 is a schematic diagram illustrating a system for providing graphical contents during a communication session according to a particular embodiment.

FIG. 1 is a schematic diagram illustrating a system for providing graphical contents during a communication session according to a particular embodiment. As illustrated in FIG. 1, system 100 may include a user communication device 102 associated with a first user which may interact with an application system 104 and/or a graphical content system 108 via a communication network 106. As illustrated, the communication network 106 may be communicatively coupled with one or more devices associated with a second user including a telephone 118 and/or a computer 120. Other devices associated with the second user may communicate with the communication network 106 via one or more intermediary devices, such as a transmitter/receiver 122 and/or a set-top box 128. For example, a wireless device 124 may communicate with the communication network 106 via the transmitter/receiver 122. Also, a television 126 may communicate with the communication network 106 via the set-top box 128. In an exemplary embodiment, a first user associated with the user communication device 102 and a second user may be associated with at least one of the other devices including the telephone 118, the computer 120, the wireless device 124 and/or the television 126 may establish a communication session. The first user may establish a communication session with the second user via the application system 104 and/or the graphical content system 108. For example, the first user may submit a call invite request message to the application system 104 to request an establishment of a communication session with the second user. The application system 104 may process the call invite request message and couple the first user to the second user for a communication session. During the communication session between the first user and the second user, the user communication device 102, the application system 104, and/or the graphical content system 108 may provide one or more graphical content from the first user to the second user and vice versa.

The user communication device 102 may be a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with the application system 104 via one or more networks (not shown) as known in the art. A first user associated with the user communication device 102 may submit one or more messages/requests to the application system 104 in order to establish a communication session with a second user via the communication network 106. The first user associated with the user communication device 102 may submit one or more graphical contents to the application system 104 and/or the graphical content system 108. In addition, the first user may view various graphical contents provided by the application system 104 and/or the graphical content system 108 via the user communication device 102.

The application system 104 may include one or more servers. For example, the application system 104 may include a UNIX based servers, Windows 2000 Server, Microsoft IIS server, Apache HTTP server, API server, Java sever, Java Servlet API server, ASP server, PHP server, HTTP server, Mac OS X server, Oracle server, IP server, or other independent server to establish a communication session between first user and second user. Also, the application system 104 may include one or more Internet Protocol (IP) network server and/or public switch telephone network (PSTN) server. For example, the application system 104 may process and encapsulate telephony signals (e.g., digital audio) in a data packet stream over the communication network 106 using Internet Protocol (IP). The application system 104 may provide direct inward dialing (DID) VoIP services and/or access a VoIP service.

The communication network 106 may be coupled to the application system 104 and the graphical content system 108. The communication network 106 may be a wireless network, a wired network or any combination of wireless network and wired network. For example, the communication network 106 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, the communication network 106 may include, without limitation, telephone line, fiber optics, IEEE Ethernet 802.3, wide area network ("WAN"), local area network ("LAN"), or global network such as the Internet. The communication network 106 may support, an Internet network, a wireless communication network, a cellular network, or the like, or any combination thereof. The communication network 106 may further include one, or any number of the exemplary types of networks mentioned above operating as a stand-alone network or in cooperation with each other.

The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

The graphical content system 108 may include one or more servers. For example, the application system 104 may include a UNIX based servers, Windows 2000 Server, Microsoft IIS server, Apache HTTP server, API server, Java sever, Java Servlet API server, ASP server, PHP server, HTTP server, Mac OS X server, Oracle server, IP server, or other independent server to establish a communication session between first user and second user. Also, the application system 104 may include one or more Internet Protocol (IP) network server and/or public switch telephone network (PSTN) server. For example, the application system 104 may process and encapsulate telephony signals (e.g., digital audio) in a data packet stream over the communication network 106 using Internet Protocol (IP). The application system 104 may provide direct inward dialing (DID) VoIP services and/or access a VoIP service.

The graphical content system 108 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The graphical content system 108 may store one or more graphical contents provided by various users in a graphical content account associated with each user. For example, a user may access the graphical content system 108 to create a graphical content account. Also, the user may provide one or more graphical contents to the graphical content system 108 to be stored in the graphical content account. The graphical content account associated with each user may include identification information associated with the user, billing information associated with the user, income information associated with the user, account information associated with the graphical content account, user preference information (e.g., processing of one or more messages), user authorization information (e.g., authorize one or more users to download the graphical contents), and/or other information to provide graphical contents.

The graphical content system 108 may provide graphical contents stored in the graphical content account to other users. Also, the graphical content system 108 may provide graphical contents to other users via the application system 104. The graphical content system 108 may provide graphical contents via various data communication protocols. For example, the graphical content system 108 may provide graphical contents via border gateway protocol (BGP), dynamic host configuration protocol (DHCP), file transfer protocol (FTP), general packet radio service (GPRS) tunneling protocol (GTP), hypertext transfer protocol (HTTP), media gateway control protocol (Magaco), routing information protocol (RIP), real-time transport protocol (RTP), real-time streaming protocol (RTSP), session description protocol (SDP), session initiation protocol (SIP), simple object access protocol (SOAP), secure shell protocol (SSH), Telnet, and/or other protocols for providing graphical contents.

The transmitter/receiver 122 coupling the wireless device 124 to the communication network 106 may be a repeater, a microwave antenna, a cellular tower, or another network access device capable of providing connectivity between two different network mediums. Transmitter/receiver 122 may be capable of sending and/or receiving signals via a mobile network, a paging network, a cellular network, a satellite network or a radio network. Transmitter/receiver 122 may provide connectivity to one or more wired networks and may be capable of receiving signals on one medium such as a wired network and transmitting the received signals on a second medium such as a wireless network.

The set-top box 128 may be an integrated receiver/decoder (IRD) device and/or a small computer that may communicatively couple the television 126 to the communication network 106. The set-top box 128 may receive and/or process an external signal and couple the external signal to the television 126. Also, the set-top 128 may receive and/or process signals from the television 126 and couple the signals to the communication network 106. In an exemplary embodiment, the set-top box 128 may be communicatively coupled to, integrated and/or associated with the television 126. The set-top box 128 may be a digital video recorder, a converter, or other device capable of coupling an external signal source to the television 128. The set-top box 128 may communicatively couple an external signal source from an Ethernet cable, a satellite dish, a coaxial cable, a telephone line, a broadband over power line, a very high frequency antenna, ultra high frequency antenna and/or other external signal source to transmit a signal to the television 126. The set-top box 128 and the television 126 may be a single device, instead of two separate devices, as shown.

Figure 2:
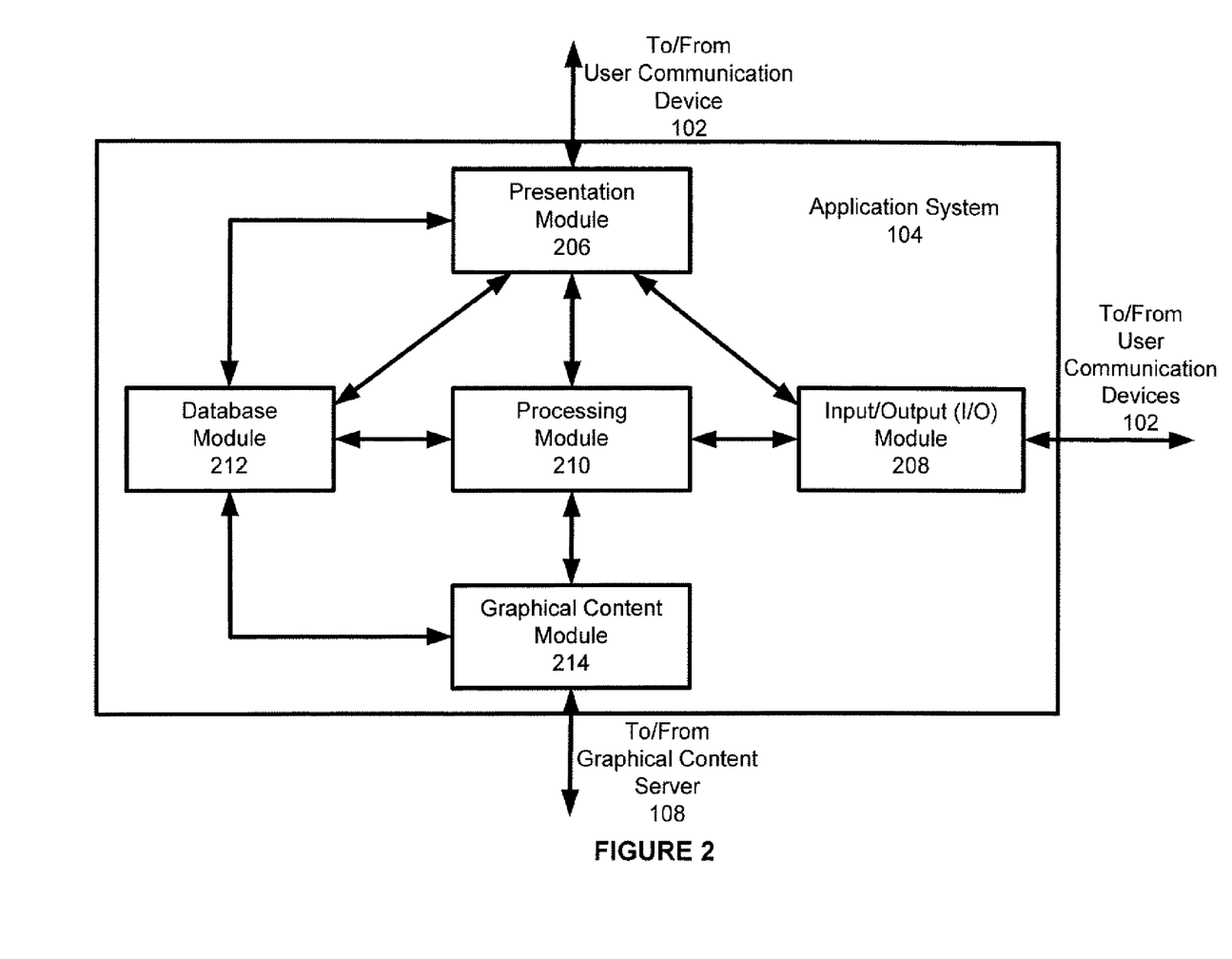
FIG. 2 is a block diagram of a hardware component of an application system for providing graphical contents during a communication session according to a particular embodiment.

FIG. 2 is a block diagram of a hardware component of an application system for providing graphical contents during a communication session according to a particular embodiment. The application system 104 may include a presentation module 206, an input/output (I/O) module 208, a processing module 210, a database module 212, and a graphical content module 214. It is noted that the modules 206, 208, 210, 212, and 214 are exemplary and the functions performed by one or more of the modules may be combined with that performed by other modules. The functions described herein as being performed by the modules 206, 208, 210, 212, and 214 also may be separated and may be located or performed by other modules. Moreover, the modules 206, 208, 210, 212, and 214 may be implemented at other components (e.g., graphical content system 108) of the system 100.

The input/output (I/O) module 208 may receive one or more call invite request messages from the user communication device 102. For example, the one or more call invite request messages may be transmitted via session initiation protocol (SIP) in order to establish a communication session (e.g., voice call and video call) over Internet protocol (IP). The one or more call invite request messages may include information associated with users of the communication session. Also, the one or more call invite request messages may include a uniform resource identifier (URI) or a uniform resource locator (URL) to identify users associated with the communication session. In an exemplary embodiment, the one or more call invite request messages may include a message header field (e.g., called "User-Agent") containing description of the software, hardware, and/or protocols used in establishing a communication session. The input/output (I/O) module 208 may use automatic number identification (ANI) information to process the one or more call invite request messages.

The input/output (I/O) module 208 may preprocess the call invite request messages received from the user communication device 102 (e.g., filter, sort, format, and aggregate). In an exemplary embodiment, the preprocessing of the call invite request messages received by the input/output (I/O) module 208 may include filtering the call invite request messages and eliminating erroneous or defective call invite request messages, sorting the call invite request messages in accordance with the locations associated with users of the communication session (e.g., numbering plan assignment (NPA) information or area code information), formatting the call invite request messages into desired format (e.g., identify various segments of the call invite request messages), and aggregating the call invite request messages from the user communication device 102 to be processed.

The one or more call invite request messages may be transferred from the input/output (I/O) module 208 to the processing module 210 for processing. The processing module 210 may determine whether to transfer the one or more call invite request messages to the graphical content system 108 for processing based at least in part on a number of functions performed by the processing module 210 and/or an amount of traffic associated with the communication network 106. In an exemplary embodiment, a number of functions the processing module 210 is performing may be determined. In the event that the number of functions the processing module 210 may be performing is greater than a predetermined threshold number of functions, the processing module 210 may transfer the one or more call invite request messages to the graphical content system 108 for processing. In the event that the number of functions the processing module 210 may be performing is less than a predetermined threshold number of functions, the processing module 210 may process the one or more call invite request messages. In another exemplary embodiment, the processing module 210 may determine an amount of traffic associated with the communication network 106. In the event that the amount of traffic associated with the communication network 106 is greater than a predetermined threshold amount of traffic, the processing module 210 may process the one or more call invite request messages. In the event that the amount of traffic associated with the communication network 106 is less than a predetermined threshold amount of traffic, the processing module 210 may transfer the one or more call invite request messages to the graphical content system 108 for processing.

The processing module 210 may process the call invite request messages to establish a communication session. The processing module 210 may include a plurality of sub-analytical modules to establish a communication session. For example, the processing module 210 may identify a first user associated with the communication session based at least in part on the call invite request message. The processing module 210 may identify a second user associated with the communication session based at least in part on the call invite request message. The processing module 210 may access the database module 212 to identify whether the first user and/or the second user may be associated with the graphical content system 108. For example, the first user may be associated with the graphical content system 108 and the first user may provide one or more graphical contents to the second user during a communication session via the graphical content system 108. Also, the second user may be associated with the graphical content system 108 and the second user may provide one or more graphical contents to the first user during a communication session via the graphical content system 108. Moreover, both the first user and the second user may be associated with the graphical content system 108 and the first user may provide one or more graphical contents to the second user and the second user may provide one or more graphical contents to the first user during a communication session via the graphical content system 108.

In another exemplary embodiment, the processing module 210 may access the database module 212 to identify whether users (e.g., first user and second user) associated with a communication session may be associated with the application system 104. For example, the first user may be associated with the application system 104 and the first user may provide one or more graphical contents to the second user during a communication session via the application system 104. Also, the second user may be associated with the application system 104 and the second user may provide one or more graphical contents to the first user during a communication session via the application system 104. Moreover, both the first user and the second user may be associated with the application system 104 and the first user may provide one or more graphical contents to the second user and the second user may provide one or more graphical contents to the first user during a communication session via the application system 104.

In the event that the users associated with a communication session are associated with the graphical content system 108, the processing module 210 may generate or instruct the graphical content module 214 to generate one or more graphical content request messages based at least in part on the one or more call invite request messages. The graphical content request message may include identity of the users associated with the communication session, graphical content account information, location of the users associated with the communication session, and/or other information that may allow the graphical content system 108 to provide graphical contents to the users associated with a communication session. The graphical content module 214 may transmit the one or more graphical content request messages to the graphical content system 108. Upon reception of the graphical content request message, the graphical content system 108 may provide one or more graphical contents to the users associated with a communication session.

In another exemplary embodiment, different graphical content request messages may be generated based at least in part on an identity of the user associated with a communication session. For example, a first user may provide different graphical contents to different users (e.g., second user, third user, or fourth user). The different graphical content request messages may instruct the graphical content system 108 to provide different graphical contents to different users associated with a communication session. For example, a first caller may have a graphical content account associated with the graphical content system 108. The graphical content account may include various types of graphical contents (e.g., pictures, videos, images, illustrations, graphs/charts, drawings/paintings). The different graphical content request messages may instruct the graphical content system 108 to transmit different types of graphical contents to different users associated with a communication session. In an exemplary embodiment, a first graphical content request message may instruct the graphical content system 108 to provide picture graphical content to a first user and a second graphical content request message may instruct the graphical content system 108 to provide video graphical content to a second user. The different graphical content request messages may instruct the graphical content system 108 to transmit different graphical contents to different users associated with a communication session. In an exemplary embodiment, a first graphical content request message may instruct the graphical content system 108 to provide first picture graphical contents (e.g., personal pictures) to a first user and a second graphical content request message may instruct the graphical content system 108 to provide second picture graphical contents (e.g., professional pictures) to a second user.

In the event that the users associated with a communication session may be associated with the application system 104, the processing module 210 may access the graphical content module 214 to obtain graphical contents associated with the users associated with the communication session. For example, the graphical content module 214 may perform similar functions as the graphical content system 108, as described above. The graphical content module 214 may store one or more graphical contents in a graphical content account associated with users of a communication session. The graphical content module 214 may provide one or more graphical contents to the processing module 210 based at least in part on the identity of the users of the communication session. For example, the graphical content module 214 may provide different graphical contents and/or different types of graphical contents based at least in part on the identity of the users associated with the communication session, as described above regarding the graphical content system 108.

The presentation module 206 may provide an interface between the user communication device 102 associated with users of a communication session and the application system 104. The presentation module 206 may include a user interface, e.g., a graphical user interface, to receive one or more queries/requests from the user and to provide graphical contents to the user via the user communication device 102. The presentation module 206 may provide a separate or a unified graphical user interface. The presentation module 206 may include an Application Programming Interface (API) to interact with the user communication device 102. In an exemplary embodiment, the presentation module 206 may present one or more graphical contents to the users associated with a communication session via the user communication device 102. For example, the presentation module 206 may provide one or more graphical contents from the graphical content module 214 to the users associated with a communication session via the user communication device 102. The presentation module 206 may provide one or more graphical contents from the graphical content system 108 (e.g., transferred by the graphical content module 214) to the users associated with a communication session via the user communication device 102.

In another exemplary embodiment, the presentation module 206 may receive one or more queries/requests from the user communication device 102. For example, the presentation module 206 may receive one or more queries/requests from the user communication device 102 to create a graphical content account for a user. In response to receiving the one or more queries/requests from the user via the user communication device 102, the presentation module 206 may send the one or more queries/requests to the database module 212 and/or the graphical content module 214 to create a graphical content account. The database module 212 may create and store identification information and/or graphical content account information associated with the user based at least in part on the one or more received queries/requests. The graphical content module 214 may also create and store graphical content account information associated with the user based at least in part on the one or more received queries/request. The graphical content module 214 may store one or more graphical contents provided by the user.

In another exemplary embodiment, the presentation module 206 may transfer the one or more queries/requests to the graphical content system 108 via the graphical content module 214 to create a graphical content account at the graphical content system 108. In other exemplary embodiments, the presentation module 206 may be located or implemented at the graphical content system 108, a user may directly create a graphical content account at the graphical content system 108. Also, the user may provide one or more graphical contents to the graphical content system 108 to be stored in the graphical content account. The graphical content system 108 may provide the graphical content account information to the application system 104. For example, the graphical content module 214 may receive the graphical content account information and update the graphical content account information stored in the graphical content module 214. The graphical content module 214 may provide the graphical content account information to the database module 212 and update the graphical content account information stored in the database module 212.

The presentation module 206 may receive one or more queries/requests from the user communication device 102 to determine user preferences. The user preferences may include a user selecting whether the application system 104 or the graphical content system 108 may process the one or more call invite request messages from the user communication device 102. In response to receiving the one or more queries/requests from a user via the user communication device 102, the presentation module 206 may send the one or more queries/requests to the input/output (I/O) module 208, the processing module 210, the database module 212 and the graphical content module 214. In response to the user preferences, the processing module 210 may process or transfer the one or more call invite request messages to the graphical content system 108 to be processed.

The user preferences may include selecting one or more users that are authorized to download the one or more graphical contents. In an exemplary embodiment, the presentation module 206 may receive one or more queries/requests from the user communication device 102 to download one or more graphical contents presented to a user. In response to receiving the one or more queries/requests from the user via the user communication device 102, the presentation module 206 may send the one or more queries/requests to the input/output (I/O) module 208, the processing module 210, the database module 212, and the graphical content module 214. The processing module 210 may access the user preferences to verify whether the user may be authorized to download the one or more graphical contents. For example, the processing module 210 may access the user preferences (e.g., stored in database module 212) in order to determine whether the user may be authorized to download the one or more graphical contents. For example, a user may authorize different types of graphical contents to different users for download. In an exemplary embodiment, a user may authorize a first user to download picture graphical content and a second user to download video graphical content. Also, a user may authorize different graphical contents to different users for download. In an exemplary embodiment, a user may authorize a first user to download first picture graphical contents and a second user to download second picture graphical contents.

The database module 212 may store and manage graphical content accounts associated with the users of a communication session. The database module 212 may provide an interface, e.g., a uniform interface, for other modules within the application system 104 and may write, read, and search users information stored in one or more repositories or databases. The database module 212 may also perform other functions, such as, but not limited to, concurrent access, backup and archive functions. Due to limited amount of storing space the database module 212 may compress, store, transfer or discard the graphical content account associated with users of a communication session stored within, after a period of time, e.g., a year. The database module 210 may provide graphical content account information of users associated with a communication session to the processing module 210. For example, the database module 210 may provide identity information and/or user preferences (e.g., download authorization or processing location of the call invite request message) associated with the user to the processing module 210. The database module 212 may be network accessible storage and may be local, remote, or a combination thereof to modules 206, 208, 210, and/or 214. The database module 212 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, database module 212 may be a database, such as an Oracle database, a Microsoft SQL Server database, a DB2 database, a MySQL database, a Sybase database, an object oriented database, a hierarchical database, or other database. The database module 212 may utilize flat file structures for storage of data.

The graphical content module 214 may provide an interface between the application system 104 and the graphical content system 108. For example, the graphical content module 214 may facilitate a transmission of graphical contents from the graphical content system 108 to the application system 104. Also, the graphical content module 214 may provide one or more messages to the graphical content system 108. The graphical content module 214 may include one or more databases to store graphical content account having one or more graphical contents of users associated with a communication session. The graphical content module 214 may interact with database module 212 to update or modify the graphical content account associated with the users of a communication session.

Figure 3:
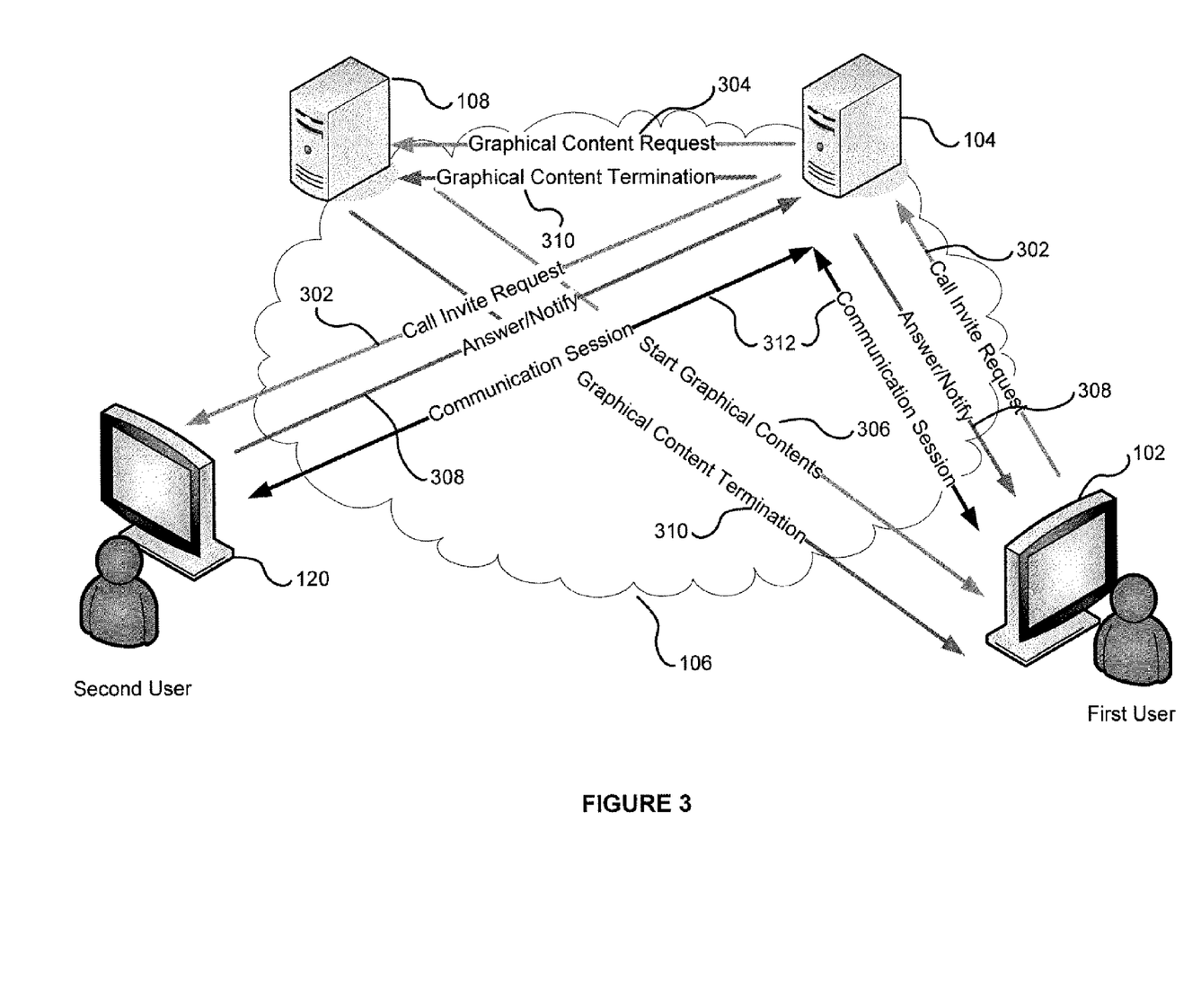
FIG. 3 is an illustration of providing graphical contents during a communication session according to a particular embodiment.

FIG. 3 is an illustration of providing graphical contents during a communication session according to a particular embodiment. A first user may transmit one or more call invite request messages 302 via the user communication device 102 to the application system 104 to establish a communication session with a second user. The application system 104 may process the call invite request message 302 to identify the second user. The application system 104 may transmit the call invite request message 302 to the user communication device (e.g., computer 120) associated with the second user. Subsequent to, simultaneously to, or prior to transmitting the call invite request message 302 to the second user, the application system 104 may identify whether the second user may have a graphical content account associated with the graphical content system 108. In the event that the second user may have a graphical content account with the graphical content system 108, the application system 104 may generate a graphical content request message 304 and transmit the graphical content request message 304 to the graphical content system 108.

The graphical content system 108 may identify the second user based on the graphical content request message 304. Also, the graphical content system 108 may identify the graphical content account associated with the second user. The graphical content system 108 may identify the user communication device 102 associated with the first user. For example, the graphical content system 108 may identify the user communication device 102 associated with first user to determine whether the user communication device 102 may display one or more graphical contents stored in the graphical content account of the second user. In the event that the user communication device 102 may display the one or more graphical contents associated with the graphical content account of the second user, the graphical content system 108 may start transmit one or more graphical contents 306 to the first user.

After receiving the call invite request message 302 from the application system 104, the second user may answer the call invite request message and the user communication device (e.g., computer 120) associated with the second user may transmit an answer/notify message 308 to the application system 104. The answer/notify message 308 may notify the application system 104 that the second user has accepted the call invite request message 302 and a communication session may be established between the first user and the second user. The application system 104 may transmit the answer/notify message 308 to the user communication device 102 of the first user. Subsequent to, simultaneously to, or prior to the application system 104 transmitting the answer/notify message 308 to the first user, the application system 104 may generate a graphical content termination message 310 and transmit the graphical content termination message 310 to the graphical content system 108.

The graphical content system 108 may receive the graphical content termination message 310 from the application system 104 and transmit the graphical content termination message 310 to the user communication device 102 associated with the first user. The graphical content system 108 may stop transmitting graphical contents stored in the graphic content account of the second user to the first user. Also, the application system 104 may establish a communication session 312 between the first user and the second user.

Figure 4:
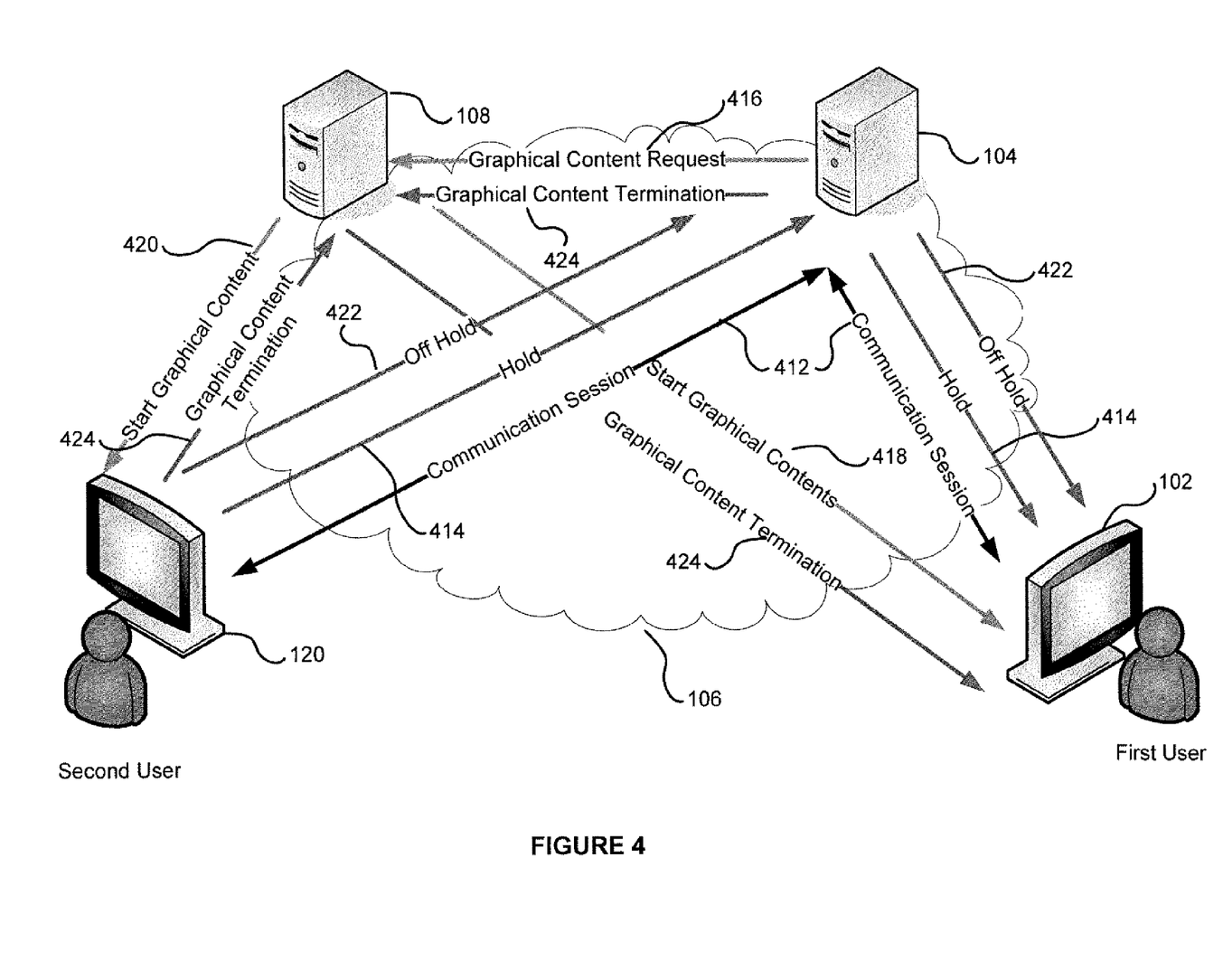
FIG. 4 is an illustration of providing graphical contents during a communication session according to a particular embodiment.

FIG. 4 is an illustration of providing graphical contents during a communication session according to a particular embodiment. The application system 104 may establish a communication session 412 between a first user and a second user. In the event that the second user may select to discontinue the communication session 412 for a period of time, the second user may select to put the first user on "hold" by transmitting a hold request message 414 to the application system 104. The application system 104 may transmit the hold request message 414 to the first user and the communication session 412 may be discontinued for a period of time. Subsequent to, simultaneous to, or prior to the application system 104 transmitting the hold request message 414 to the first user, the application system 104 may generate a graphical content request message 416 and transmit the graphical content request message 416 to the graphical content system 108.

The graphical content system 108 may identify the second user based on the graphical content request message 416. Also, the graphical content system 108 may identify the graphical content account associated with the second user. The graphical content system 108 may identify the user communication device 102 associated with the first user. For example, the graphical content system 108 may identify the user communication device 102 associated with first user to determine whether the user communication device 102 may display one or more graphical contents stored in the graphical content account of the second user. In the event that the user communication device 102 may display one or more graphical contents stored in the graphical content account of the second user, the graphical content system 108 may start transmit one or more graphical contents 418 to the first user.

The graphical content system 108 may identify the first user based on the graphical content request message 416. The graphical content system 108 may identify the graphical content account associated with the first user. The graphical content system 108 may identify the user communication device (e.g., computer 120) associated with the second user. For example, the graphical content system 108 may identify the user communication device (e.g., computer 120) associated with the second user to determine whether the user communication device (e.g., computer 120) may display one or more graphical contents stored in the graphical content account of the first user. In the event that the user communication device (e.g., computer 120) associated with the second user may display one or more graphical contents stored in the graphical content account of the first user, the graphical content system 108 may start transmitting one or more graphical contents 420 to the second user.

In the event that the second user may wish to continue the established communication session 412, the second user may transmit an off hold request message 422 to the application system 104. The application system 104 may process the off hold request message 422 and transmit the off hold request message 422 to the user communication device 102 associated with the first user. The application system 104 may resume the established communication session 412 between the first user and the second user.

Subsequent to, simultaneous to, or prior to transmitting the off hold request message 422 to the application system 104, the user communication device (e.g., computer 120) associated with the second user may transmit a graphical content termination request message 424 to the graphical content system 108 to terminate the transmission of the graphical contents. Also, subsequent to, simultaneous to, or prior to the application system 104 transmitting the off holder request message to the first user, the application system 104 may transmit a graphical content termination request message to the graphical content system 108 to terminate the transmission of the graphical content to the first user. The graphical content system 108 may receive the graphical content termination request message 424 from the application system 104 and transmit the graphical content termination request message 424 to the user communication device 102 associated with the first user. The graphical content system 108 may stop transmitting graphical contents stored in the graphic content account of the second user to the first user.

Figure 5:
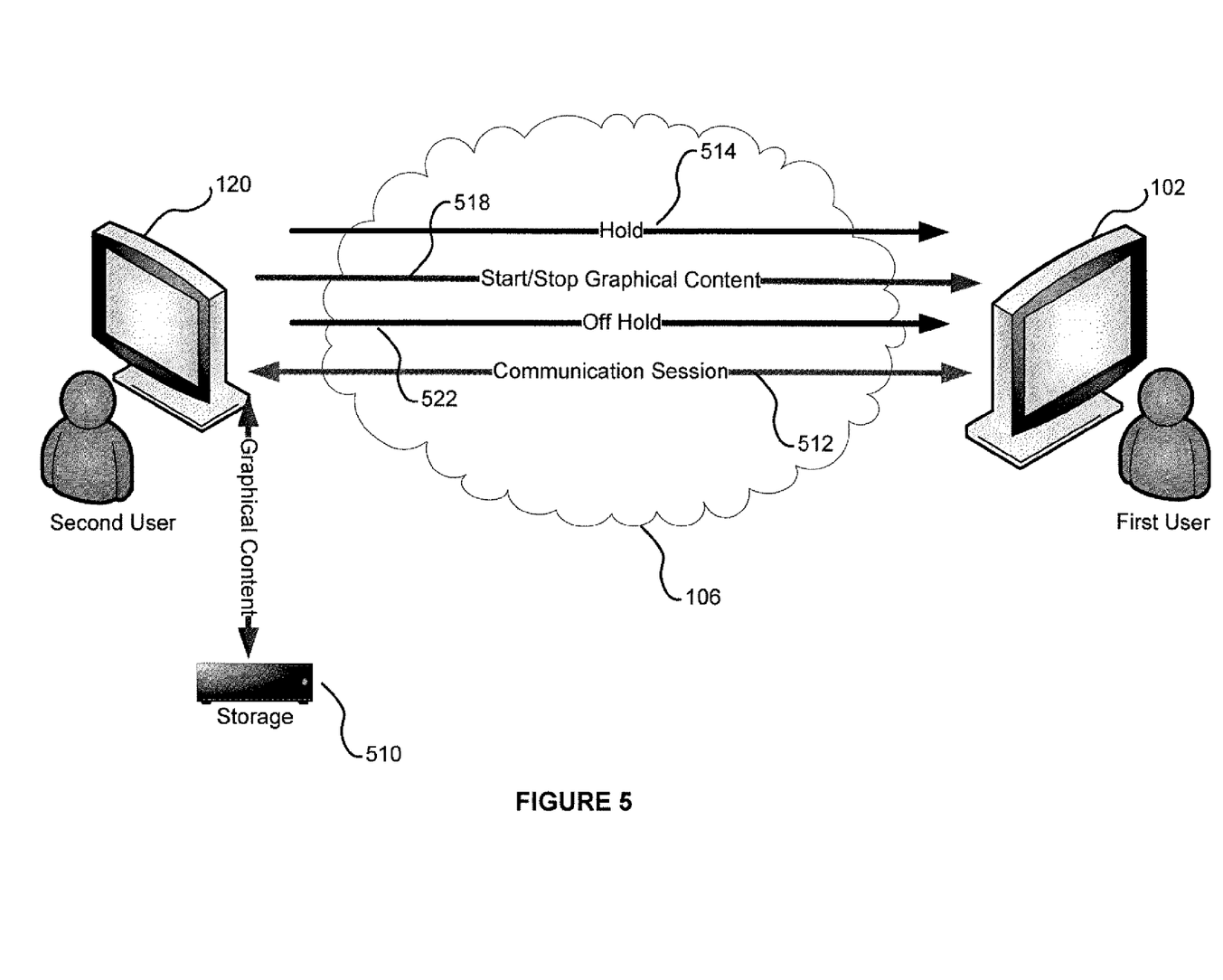
FIG. 5 is an illustration of providing graphical contents during a communication session according to a particular embodiment.

FIG. 5 is an illustration of providing graphical contents during a communication session according to a particular embodiment. A communication session 512 may be established between a first user and a second user. In the event that the second user may select to discontinue the communication session 512 for a period of time, the second user may select to put the first user on "hold" by transmitting a hold request message 514 to the first user and the communication session 512 may be discontinued for a period of time. The user communication device (e.g., computer 120) associated with the second user may identify the user communication device 102 associated with the first user. For example, the user communication device (e.g., computer 120) associated with the second user may identify the user communication device 102 associated with first user to determine whether the user communication device 102 may display one or more graphical contents. In the event that the user communication device 102 may display one or more graphical contents, the user communication device (e.g., computer 120) may start transmit one or more graphical contents 518 to the first user.

For example, the user communication device (e.g., computer 120) may transmit graphical contents from the user communication device (e.g., computer 120) or a storage device associated with the user communication device. In an exemplary embodiment, the user communication device (e.g., computer 120) may transmit graphical contents from a storage device 510 associated with the user communication device (e.g., computer 120). The storage device 510 may be connected to, integrated or otherwise associated with the user communication device associated with the second user (e.g., computer 120). The storage device 510 may be digital video recorders (DVRs) and/or personal video recorders (PVRs). Also, the storage device 510 may be hard disk-based DVRs, dual-tuner DVRs, PC-based DVRs (e.g., Linux, Mac OS, and/or Windows). The storage device 510 may include, but not limited to, a portable media players (PMP), and/or other software for personal computers for store graphical contents and play back to and/or from disks.

In the event that the second user may wish to continue the established communication session 512, the second user may transmit an off hold request message 522 to the second user. The communication session 512 may be resumed between the first user and the second user. Subsequent to, simultaneous to, or prior to transmitting the off hold request message 522 to the first user, the user communication device (e.g., computer 120) associated with the second user may terminate the transmission of the graphical contents. The user communication device (e.g., computer 120) associated with the second user may stop transmitting graphical contents to the first user.

Figure 6:
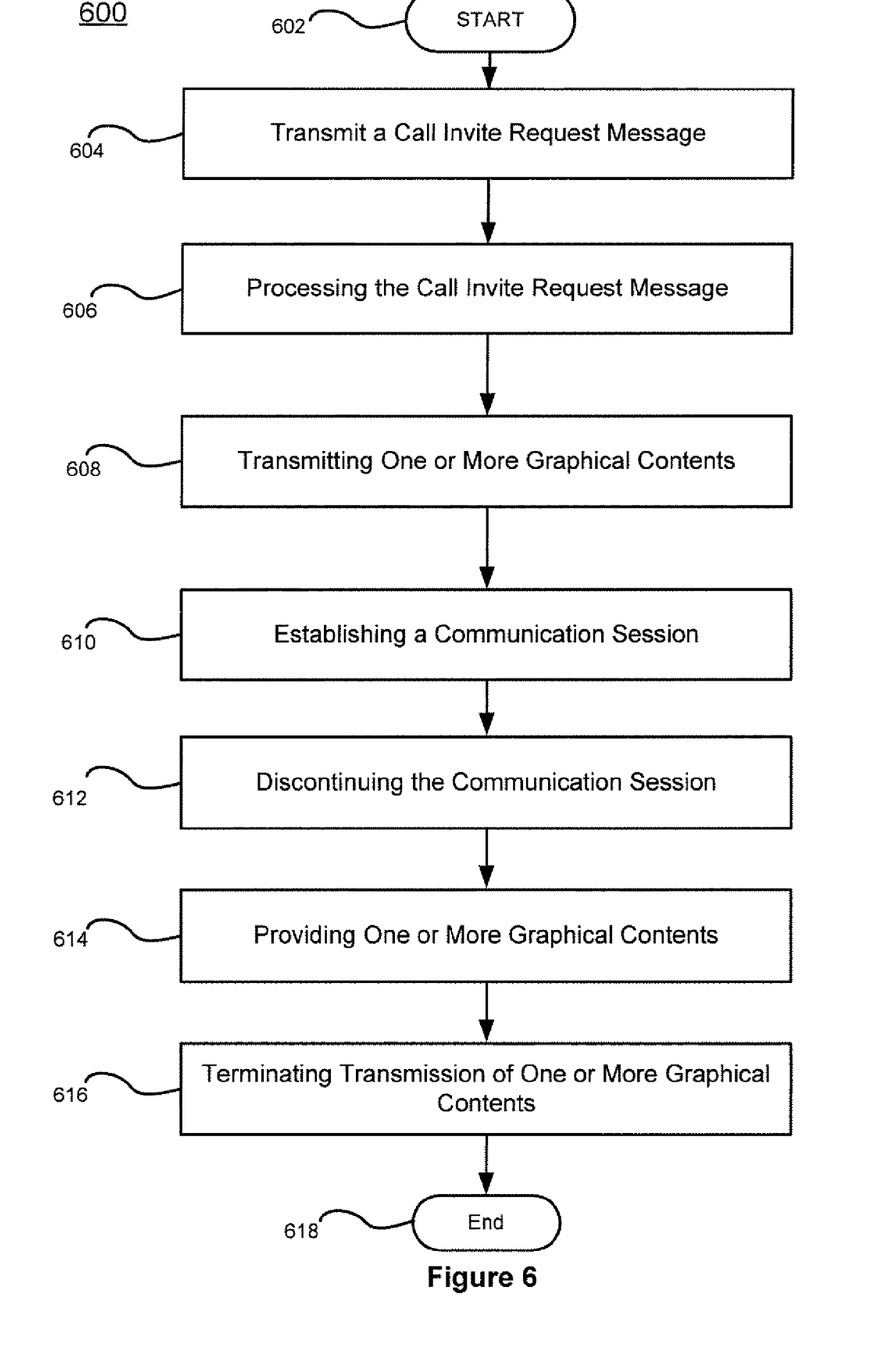
FIG. 6 is a flowchart illustrating the functionality for providing graphical contents during a communication session according to a particular embodiment.

FIG. 6 is a flowchart illustrating the functionality for providing graphical contents during a communication session according to a particular embodiment. This exemplary method 600 may be provided by way of example, as there are a variety of ways to carry out the method. The method 600 shown in FIG. 6 can be executed or otherwise performed by one or a combination of various systems. The method 600 is described below may be carried out by the system and network shown in FIGS. 1-5, by way of example, and various elements of the system and network are referenced in explaining the example method of FIG. 6. Each block shown in FIG. 6 represents one or more processes, methods or subroutines carried out in exemplary method 600. Referring to FIG. 6, exemplary method 600 may begin at block 602.

At block 602, the method 600 for providing graphical contents during a communication session may begin.

At block 604, one or more call invite request messages may be transmitted from a user communication device 102 to an application system 104 to initiate a communication session (e.g., a call session). The one or more call invite request messages may include a uniform resource identifier (URI) or a uniform resource locator (URL) to identify users associated with a communication session. In an exemplary embodiment, the one or more call invite request messages may include a message header field (e.g., called "User-Agent") containing description of the software, hardware, and/or protocols used in establishing a communication session. After transmitting one or more call invite request messages from the user communication device 102 to the application system 104, the method 600 may proceed to block 606.

At block 606, the one or more call invite request messages may be processed at the application system 104. For example, the application system 104 may determine whether to transfer the one or more call invite request messages to the graphical content system 108 for processing based at least in part on a number of functions performed by the processing module 210 and/or the amount of traffic associated with the communication network 106. Also, the application system 104 may identify users associated with a communication session based at least in part on the call invite request message. The application sever 104 may determine whether the users associated with a communication session may be associated with the graphical content system 108. The application system 104 may provide the one or more call invite request message to the user communication device 102 associated with the second user. The application system 104 may generate one or more graphical content request messages based at least in part on the one or more call invite request messages and provide the graphical content request messages to the graphical content system 108. After processing the one or more call invite request messages at the application system 104, the method 600 may proceed to block 608.

At block 608, one or more graphical contents may be transmitted to the first user. For example, the application system 104 may provide one or more graphical contents to the first user. Also, the graphical content system 108 may provide one or more graphical contents to the first user based at least in part on the graphical content request messages. The graphical contents may be provided via various protocols (e.g., real-time transport protocol (RTP) or real-time streaming protocol (RTSP)). After transmitting one or more graphical contents to the first user, the method 600 may proceed to block 610.

At block 610, a communication session may be established between the first user and the second user. Upon reception of the call invite request messages, the second user may answer the call invite request messages to establish a communication session with the first user. For example, the user communication device (e.g., computer 120) associated with the second user may transmit an answer/notify message to the application system 104. The answer/notify message may notify the application system 104 that the second user has accepted the call invite request messages. The application system 104 may establish a communication session between the first user and the second user based at least in part on the answer/notify message. Upon the establishment of the communication session between the first user and the second user, the application system 104 may transmit a graphical content termination request message to the graphical content system 108 to termination the transmission of the graphical contents. The graphical content system 108 may terminate the transmission of the graphical contents and transmit a graphical content termination message to the first user. After establishing a communication session between the first user and the second user, the method 600 may proceed to block 612.

At block 612, during the established communication session, the second user may select to discontinue the communication session for a period of time. For example, in the event that the second user wishes to discontinue the communication session for a period of time, a hold request message may be generated by the user communication device 102 associated with the second user and provided to the application system 104. The application system 104 may provide the hold request message to the first user and the established communication session may be on hold and may be continued at a later time. After discontinuing the communication session for a period of time, the method 600 may proceed to block 614.

At block 614, one or more graphical contents may be provided to the first user during the discontinued time period of the communication session. For example, during the discontinued time period of the communication session, the application system 104 may transmit a graphical content request message to the graphical content system 108. The graphical content system 108 may provide one or more graphical contents to the first user. Also, the graphical content system 108 may provide one or more graphical contents to the second user. In another exemplary embodiment, a storage device 510 storing one or more graphical contents may be associated with the second user. The user communication device 102 associated with the second user may provide the one or more graphical contents stored in the storage device 510 to the first user. After providing one or more graphical contents to the first user, the method 600 may proceed to block 616.

At block 616, the transmission of the one or more graphical contents may be terminated. For example, the second user may select to continue the established communication session. The user communication device 102 associated with the second user may generate an off hold message to the application system 104. The application system 104 may provide the off hold message to the first user to resume the established communication session. Upon reception of the off hold message, the application system 104 may provide a graphical content termination message to the graphical content system 108. The graphical content system 108 may terminate the transmission of the graphical contents based at least in part on the graphical content termination message. The graphical content system 108 may provide the graphical content termination message to the first user. In the event that the graphical content was not completely transmitted to the first user, the transmission of the partially transmitted graphical content may be resumed at a later time. In another exemplary embodiment, the transmission of the one or more graphical content may be terminated in the event that the established communication session is terminated.

The description above describes communication devices, an application system, a graphical content system, a communication network having network elements, storage devices, various networks, and other elements for coupling user via the communication network, some of which are explicitly depicted, others of which are not. As used herein, the term "module" may be understood to refer to executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
    receiving, via one or more computer processors, one or more call invite request messages from a first communication device associated with a first user to establish a communication session in a communication network with a second communication device associated with a second user;
    processing, via the one or more computer processors, the one or more call invite request messages, wherein the processing comprises:
        responsive to receiving the one or more call invite request messages, determining whether the second user is associated with a graphical content account; and
        upon determining that the second user is associated with the graphical content account, generating one or more graphical content request messages;
    identifying, based on the one or more graphical content request messages, the second user and one or more graphical contents from the graphical content account associated with the second user;
    transmitting, via the one or more computer processors, to the first communication device associated with the first user the one or more graphical contents from the graphical content account associated with the second user before an establishment of the communication session; and
    establishing, via the one or more computer processors, a communication session between the first user and the second user;
    receiving a hold request message from the second communication device to discontinue the established communication session for a period of time;
    transmitting one or more additional graphical content request messages during the discontinued period of time to provide one or more additional graphical contents to the first user;
    receiving an off hold request message from the second communication device to continue the established communication session;
    transmitting the off hold request message to the first communication device;
    upon receiving the off hold request message, transmitting one or more graphical content termination request messages to a graphical content system and to the first communication device to terminate transmission of the one or more additional graphical contents; and
    upon determining that at least a portion of the one or more additional graphical contents was not transmitted to the first user, resuming transmission of the portion of the one or more additional graphical contents to the first user, when the second user further requests to discontinue the established communications session for another period of time after terminating the transmission of the one or more additional graphical contents.

2. The method of claim 1, wherein the one or more call invite request messages comprise at least one of a uniform resource identifier (URI) and a uniform resource locator (URL) to identify the one or more users of the communication session.

3. The method of claim 1, wherein processing the one or more call invite request messages further comprises determining whether to transfer the one or more call invite request messages to the graphical content system for processing based at least in part on a number of functions performed by the one or more computer processors or an amount of traffic associated with the communication network.

4. The method of claim 3, wherein the determination is to transfer the one or more call invite request messages to the graphical content system for processing in the event that a number of functions performed by the one or more computer processors is greater than a predetermined threshold number of functions.

5. The method of claim 3, wherein the determination is to transfer the one or more call invite request messages to the graphical content system for processing in the event that an amount of traffic associated with the communication network is less than a predetermined threshold amount of traffic.

6. The method of claim 1, further comprising receiving an answer/notify message to establish the communication session.

7. The method of claim 6, further comprising terminating the transmission of the one or more graphical contents from the graphical content account upon the establishment of the communication session.

8. The method of claim 6, further comprising storing via the one or more processors the one or more graphical contents of the graphical content account.

9. The method of claim 7, wherein terminating the transmission of the one or more graphical contents further comprises generating one or more graphical content termination messages.

10. The method of claim 1, further comprising receiving one or more queries/requests to download the one or more graphical contents.

11. The method of claim 10, further comprising authorizing download of the one or more graphical contents based at least in part on the first user or the second user of the communication session.

12. The method of claim 1, wherein the one or more call invite request messages are transmitted via Session Initiation Protocol (SIP).

13. The method of claim 1, wherein the communication session comprises at least one of: a video call, a video teleconferencing call, a telephone call, and a Voice over IP (VoIP) call.

14. The method of claim 1, wherein the one or more graphical contents comprises at least one of: pictures, videos, slide shows, graphic drawings, graphic paintings, graphs, and charts.

15. The method of claim 1, wherein the one or more graphical contents are provided by the second user to the graphical content system to be stored in the graphical content account.

16. A system, comprising:
a computing device, comprising one or more computer processors and being communicatively coupled to a network, the computing device being configured to:
receive one or more call invite request messages from a first communication device associated with a first user to establish a communication session in a communication network with a second communication device associated with a second user;
process the one or more call invite request messages to:
determine, responsive to receiving the one or more call invite request messages, whether the second user is associated with a graphical content account; and generate, upon determining that the second user is associated with the graphical content account, one or more graphical content request messages;
identify, based on the one or more graphical content request messages, the second user and one or more graphical contents from the graphical content account associated with the second user; and
transmit to the first communication device associated with the first user the one or more graphical contents from the graphical content account associated with the second user before an establishment of the communication session; and
establish a communication session between the first user and the second user;
receive a hold request message from the second communication device to discontinue the established communication session for a period of time;
transmit one or more additional graphical content request messages during the discontinued period of time to provide one or more additional graphical contents to the first user;
receive an off hold request message from the second communication device to continue the established communication session;
transmit the off hold request message to the first communication device;
upon receiving the off hold request message, transmit one or more graphical content termination request messages to a graphical content system and to the first communication device to terminate transmission of the one or more additional graphical contents; and
upon determining that at least a portion of the one or more additional graphical contents was not transmitted to the first user, resume transmission of the portion of the one or more additional graphical contents to the first user, when the second user further requests to discontinue the established communications session for another period of time after terminating the transmission of the one or more additional graphical contents.

17. The system of claim 16, wherein the one or more call invite request messages comprise at least one of a uniform resource identifier (URI) and a uniform resource locator (URL) to identify the one or more users of the communication session.

18. The system of claim 16, wherein the computing device is further configured to determine whether to transfer the one or more call invite request messages to the graphical content system for processing based at least in part on a number of functions performed by the one or more computer processors or an amount of traffic associated with the communication network.

19. The system of claim 16, further comprising one or more computer processors configured to store at least one of identification information associated with one or more users of the communication session and graphical content account information associated with the one or more users of the communication session.

20. The system of claim 16, wherein the computing device is further configured to authorize download of the one or more graphical contents based at least in part on the first user or the second user of the communication session.

* * * * *